UNITED STATES PATENT OFFICE.

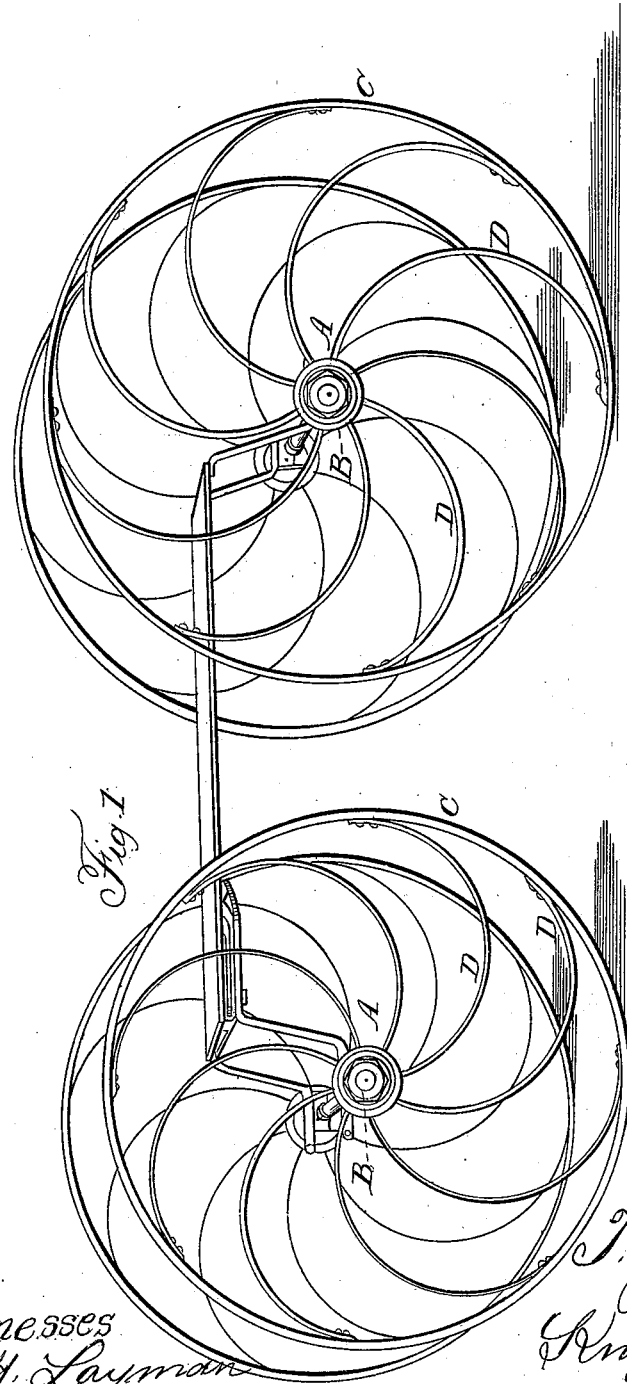

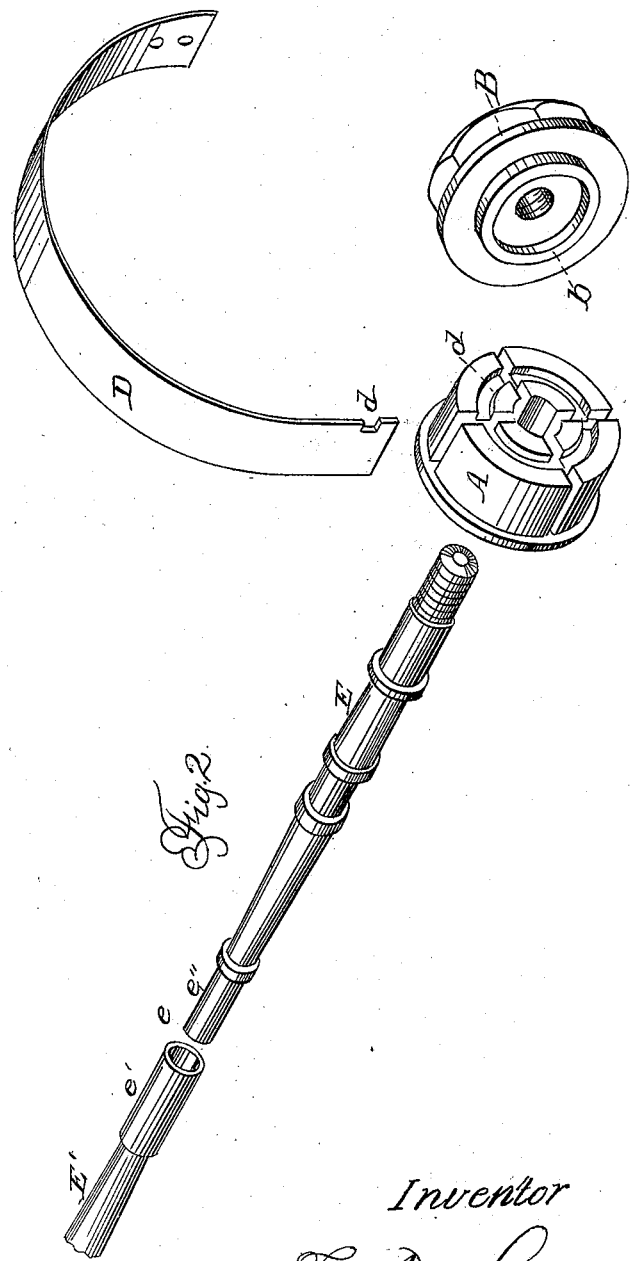

THOMAS A. LANE, OF CINCINNATI, OHIO.

IMPROVEMENT IN WHEELS AND AXLES.

Specification forming part of Letters Patent No. 52,422, dated February 6, 1866.

*To all whom it may concern:*

Be it known that I, THOMAS A. LANE, of Cincinnati, Hamilton county, and State of Ohio, have invented certain new and useful Improvements in Wheels and Axles; and I do hereby declare the following to be a full, clear, and exact description thereof, reference being had to the accompanying drawings, making part of this specification.

My invention consists in so constructing the wheels of carriages that all the spring or elasticity required by the vehicle may be in the wheels themselves, thus, besides saving the expense of the springs and other obvious advantages, enabling the body of the carriage and center of gravity of the whole to be brought nearer the ground than with springs between the body and axles.

My invention further consists, in connection with this form of wheel, in replacing the customary axles with shafts or spindles, which are securely fastened in the hubs of the wheels, said spindles separating at mid-width of the carriage, the divided parts running one within the other or in suitable sleeves. The wheels may thus act independently and yet possess the stability essential to wheels formed on my plan.

In the accompanying drawings, Figure 1 is a perspective view of a carriage embodying my improvements. Fig. 2 exhibits the hub and axle in detail.

A is the hub of the wheel, constructed, as shown, with an annular groove, $a$, corresponding in size and position with the projection $b$ on nut B.

The tire C is connected to the hub by curved metal plates D, in place of the straight rigid spokes of the common wheel.

The plates D are notched at $d$, to correspond with the groove and projection $a$ $b$.

E E' are the shafts or spindles, which meet mid-width of the vehicle at $e$. The part E is provided with a socket, $e'$, adapted to receive and allow freely to revolve within it the shank $e''$.

The end of the axle is turned to fit the hub A snugly, and is secured to the same by the nut B, the operation of tightening also serving to secure the notched ends of the metal plates D.

The plates D are secured to the tires, as shown, by rivets or bolts. The plates D are so thin as to be possessed of a great amount of elasticity; and the rim or tire is also sufficiently elastic to assume an elliptical form under a load; and the wheel, when connected in the manner shown, will have all the desired elasticity for direct connection through the spindles with the body of the carriage.

The axle being divided at $e'$ allows each wheel to act independently and admits of a rigid connection of great stability between the hub and axle.

I do not claim either a divided axle or an elastic spoked wheel in itself considered; but

What I claim as my invention, and desire to secure by Letters Patent, is—

1. A carriage-wheel provided with curved and elastic metallic spokes D, substantially as described, rigidly united to a spindle or shaft, to be coupled to, but to revolve independently of, the shaft of the corresponding wheel.

2. A wheel whose spokes consist of yielding metallic plates coinciding in form with a circular or other simple arc.

In testimony of which invention I hereunto set my hand.

THOMAS A. LANE.

Witnesses:
   GEO. H. KNIGHT,
   JAMES H. LAYMAN.